United States Patent
Consoli et al.

(10) Patent No.: US 6,559,618 B1
(45) Date of Patent: *May 6, 2003

(54) SYSTEM AND METHOD OF CONTROL FOR SENSORLESS INDUCTION MOTOR DRIVES

(75) Inventors: Alfio Consoli, Catania; Giuseppe Scarcella, Furci Siculo; Antonio Testa, Acireale, all of (IT)

(73) Assignee: Universita Degli Studi di Catania (IT)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/501,056

(22) Filed: Feb. 9, 2000

(30) Foreign Application Priority Data

Jul. 29, 1999 (IT) .......................... TO99A0669

(51) Int. Cl.[7] .............. H02P 1/24; H02P 1/42; H02P 3/18; H02P 5/28; H02P 7/36

(52) U.S. Cl. .............. 318/727; 318/801; 318/806; 318/811

(58) Field of Search .............. 318/727, 767, 318/701, 798–817

(56) References Cited

U.S. PATENT DOCUMENTS

| | | | | |
|---|---|---|---|---|
| 4,011,489 A | * | 3/1977 | Franz et al. ............. | 318/227 |
| 4,445,080 A | | 4/1984 | Curtiss | |
| 5,254,918 A | | 10/1993 | Ueki | |
| 5,272,429 A | * | 12/1993 | Lipo et al. ............. | 318/808 |
| 5,334,923 A | * | 8/1994 | Lorenz et al. ............. | 318/805 |
| 5,559,419 A | | 9/1996 | Lorenz et al. | |
| 5,585,709 A | * | 12/1996 | Jansen et al. ............. | 318/807 |
| 5,886,498 A | * | 3/1999 | Sul et al. ............. | 318/821 |
| 6,137,258 A | * | 10/2000 | Jansen ............. | 318/802 |

FOREIGN PATENT DOCUMENTS

| | | |
|---|---|---|
| DE | 44 13 809 | 11/1994 |
| EP | 0 579 694 | 12/1995 |

OTHER PUBLICATIONS

"Sensorless Control of Permanent–Magnet Synchronous Machines at Arbitary Operating Points Using a Modified "Inform " Flux Model", M. Schrodl, European Transactions on Electrical Power Engineering, Jul./Aug. 1993, No. 4, Berlin, DE, XP 000398518.

"Speed Sensorless AC drive for High Dynamic Performance and Steady State Accuracy" J. Jiang, et al., XP 000804011.

"Comparison of Carrier Signal Voltage and Current Injection for the Estimation of Flux Angle of Rotor Position", L.A.S. Ribeiro, et al., XP 000559336.

* cited by examiner

Primary Examiner—Robert E. Nappi
Assistant Examiner—Edgardo San Martin
(74) Attorney, Agent, or Firm—Altera Law Group LLC

(57) ABSTRACT

A system and a method of vector sensorless control for electrical drives with induction motors, based on the generation of a high frequency rotating magnetic field which, by composing with the main magnetic field, produces a change of the saturation level as a function of the relative positions taken during the motion. Variation of the saturation level produces a modulation of the zero sequence component of the stator voltage, which is used to evaluate the position of the main field.

11 Claims, 2 Drawing Sheets

SYSTEM AND METHOD OF CONTROL FOR SENSORLESS INDUCTION MOTOR DRIVES

FIELD OF INVENTION

The present invention refers to a system and to the relative control method for sensorless drives with an induction motors.

DESCRIPTION OF RELATED ART

Currently field oriented, or vector controlled, induction motor drives are widely used in various industrial applications, such as machine tools, pumps, conveyor belts and others, wherein they are progressively replacing the traditional, direct current, electric drive means, thanks also to their improved ruggedness, reduced maintenance and to the lower production costs.

Field oriented control is based on the independent control of the two stator current vector components which are defined in a reference system synchronous with the rotor flux. The instantaneous position of the rotor flux, necessary for implementing field oriented control, can be measured using Hall effect flux sensors. However, such sensors do not provide, in practice, the required precision; further, their instalment often creates problems, whereby it is preferable to obtain the position of the rotor flux in an indirect way, through calculation of the equations of a mathematical model of the motor.

This last technique is today, by far the most used, even though it requires an angular position transducer of the machine shaft with a resolution equal at least to 8 bits and although the so obtained results are extremely sensitive to the rotor resistance changes caused by the temperature.

Sensitivity to the parameter variation and the need to introduce within the drive system a relatively expensive position sensor have initiated, the development of alternative techniques, of the "sensorless" type, suitable to determine the rotor flux position without using a position transducer.

Sensorless vector control techniques are based on various principles, and the best known are the direct field oriented control techniques, wherein the rotor flux position is obtained from the back electromotive force (EMF).

Techniques based on such a principle can be easily implemented at a low cost, but they fail at low and zero rotor speeds.

More sophisticated, sensorless type, techniques based on injecting suitable reference signals and on measuring the high frequency current harmonics allow to reduce significantly the minimum motor speed allowed by the control; however also such techniques do not completely solve the problem of the field oriented control at very low or zero speeds.

On this regard, it has to be noted that the motor control at very low and zero speeds is required very frequently and, in particular, it is useful in electric traction applications, in robotics, in many machine tools of the new generation and, in general, in all applications where it is required to balance a load at standstill or to bring the tool back to a defined position.

SUMMARY OF THE INVENTION

A purpose of the present invention is therefore to realise a control system for induction motor drives able to overcome the above mentioned disadvantages and, in particular, to define a control system to realise "sensorless" type drive means, suitable to properly work at very low speeds or even at zero speed.

Another purpose of the present invention is to define a control method for induction motor drives able to determine the position of the airgap flux and, consequently, the rotor flux position, independently from the rotor speed.

A further purpose of the present invention is to realise a control system for induction motor drives and to indicate an implementation scheme using conventional circuits and computing devices easy to install and to use, at low costs compared to standard techniques and in consideration of the attained advantages.

According to the present invention, these purposes are achieved by defining a control system for induction motor drives and the relative control method to which we must refer for the sake of brevity.

Advantageously, the proposed invention, emploies high frequency test signals and is based on the evaluation of the effects of said signals on the zero sequence components of the stator voltage or current.

Such a feature allows to overcome the imprecision found in other techniques using high frequency signals, due to the fact that the high frequency fluxes follow different paths than the low frequency fluxes and that the high frequency current components must be separated from the low frequency ones.

BRIEF DESCRIPTION OF THE DRAWINGS

Further object, features and advantages of the induction motor drives realised according to the invention, will be better understood from the following detailed description, relative to an example of a preferred and explanatory, non limiting, implementation which refers to the accompaning attached schematic drawings, wherein.

With reference to the above mentioned figures, T3 indicates the third harmonic component of the airgap flux T3, BS indicates the feeding bus of the inverter PWM, ST1, ST2, ST3 indicate the windings of the three phases of the stator ST of the electric machine, TV indicates a voltage transducer, PA indicates a high-pass filter, PB indicates a low-pass filter, EB indicates a notch filter, C indicates an electronic device to evaluate the position of the flux TF, CC indicates a control system of the current, while B1 and B2 indicate two devices useful to perform the vector control of the electric machine in a predefined reference system.

DETAILED DESCRIPTION OF THE INVENTION

Induction motors, in normal operating conditions and rated flux, work in the bend area of the curve B-H of the ferromagnetic material which represents the core; further, the ferromagnetic core of the machine is more saturated along the flux direction.

As a consequence, the saturation causes a local anisotropy of the induction machine which, by itself, has a non salient magnetic structure.

The space distribution of the flux at the air gap TF is not perfectly sinusoidal, due to saturation, with a harmonic content characterised by the presence of all the odd and zero sequence harmonics, but strongly influenced by the third harmonic component T3. The third harmonic T3 of the flux at the air gap TF induces, in the three phases F1, F2, F3 of the stator windings ST1, ST2, ST3, three third harmonic voltages V31, V32, V33, which are in phase among them, and form a zero sequence three phase voltage.

Figure 1:
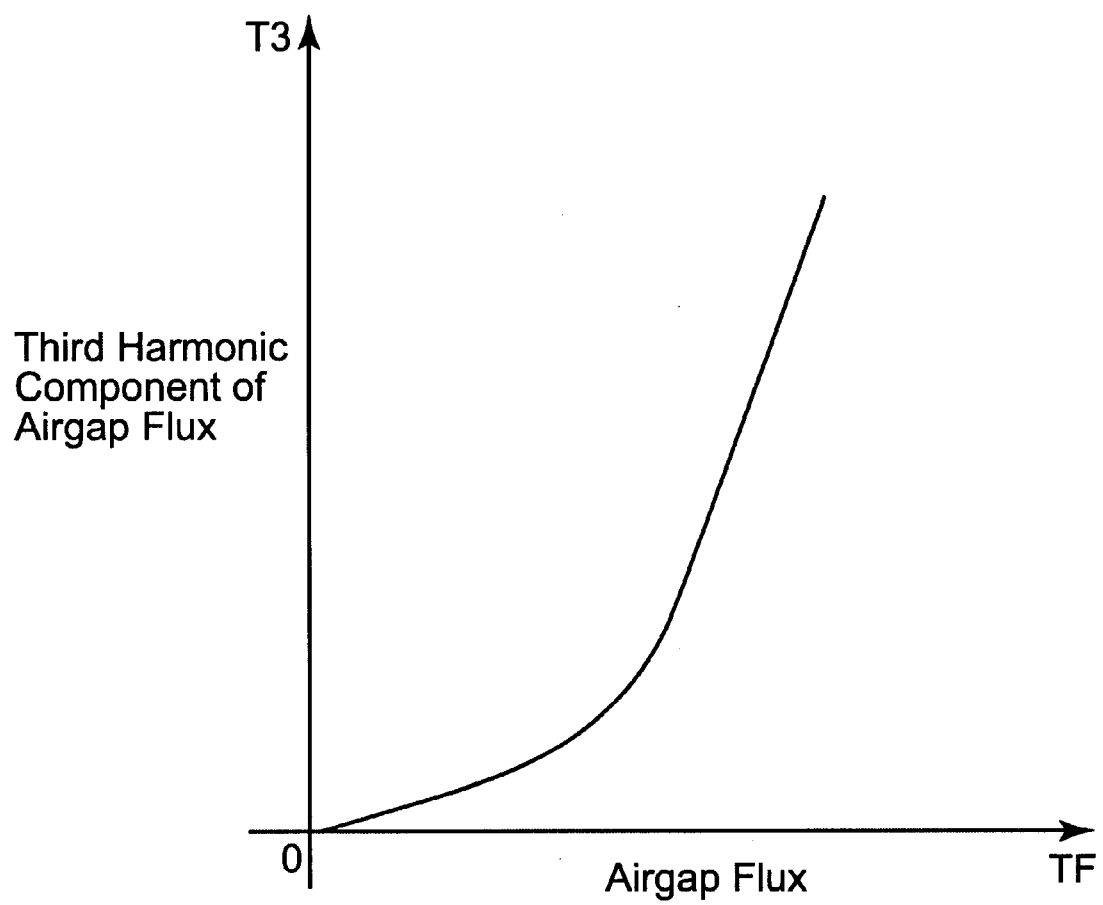
FIG. 1 shows the relationships between the third harmonic flux path and the airgap flux of an induction motor.

Variation of the third harmonic flux T3 as a function of the main flux TF can be determined experimentally and is not linear, as shown in FIG. 1.

If a direct or an inverse set of high frequency three-phase voltages VM is added to the stator three-phase voltage, a high frequency rotating magnetic field will be produced, which interacts with the main magnetic field.

The high frequency rotating field produces a change of the saturation level of the magnetic circuit of the machine which is a function of the position taken during its rotation; in particular, such a high frequency field will cause a saturation increase when aligned and phased with the main field, it will produce no effect when in quadrature with the main field, and finally it will decrease the saturation level when aligned in counter-phase with the main field.

Because of the change of saturation, due to interaction between the main field and the high frequency field, the zero sequence component of the flux at the air gap TF, usually characterised by the presence of the third harmonic component T3, also includes a high frequency harmonic proportional to the speed difference between the main rotating magnetic field and the high frequency field. The fact that the relation between the airgap flux and its third harmonic component is not linear provides to enhance the phenomenon, thus making significant the high frequency harmonic of the flux and able to induce a zero sequence high frequency voltage component in addition to the set of third harmonic voltages V31, V32, V33. If the zero sequence path is closed through the ground, then also a high frequency zero sequence component of the stator current is generated.

These results can also be obtained by introducing a direct or inverse symmetric tern of high frequency currents or by introducing a high frequency current IA along the direction of the airgap flux TF.

Since the machine is a three wire system, the set of third harmonic voltages V31, V32, V33 and the high frequency harmonic components can be picked up directly at the terminals N of the stator ST without any phase error, possibly due to the voltage drop on the stator resistance and leakage inductance in the zero sequence equivalent circuit.

Then, the total zero sequence voltage can be obtained by adding, the three phase voltages of the machine at any time instant.

Alternatively, it is possible to pick up the voltage between the star centre N of the stator windings ST1, ST2, ST3 (which has to be always accessible) and the central point O of the capacitors C1, C2 of the direct current bus BS, which feeds the inverter PWM with width impulse modulation.

A further alternative is to measure the total zero sequence current (ISM).

The third harmonic component of the zero sequence voltage VSM (which is the output of the voltage transducer TV in FIG. 2), or of the zero sequence current ISM, is eliminated by a high-pass filter PA, while further harmonics, as those produced by the inverter PWM, the rotor slot harmonics as well as high frequency noises, are eliminated by means of a low-pass filter PB.

The position of the airgap flux TF is obtained by measuring, using a computing device C, the maximum, minimum and zero points of the remaining high frequency component.

Figure 2:
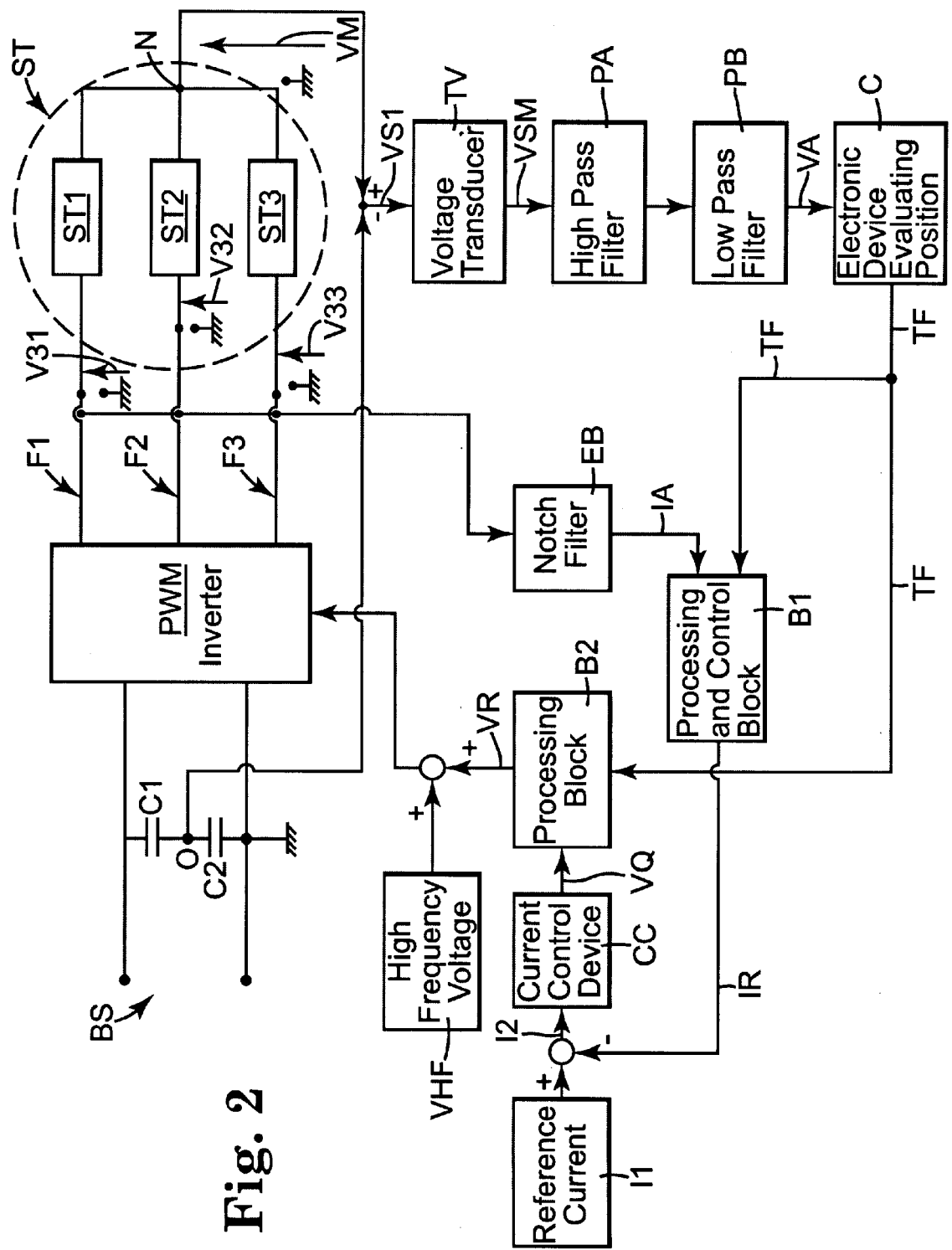
FIG. 2 is a schematic diagram of an exemplary sensorless control system for induction motor drives, according to the present invention.

The control method, according to the invention, can be experimentally implemented in a simple and inexpensive way as the one illustrated in the schematic diagram of FIG. 2.

The injection of the set of high frequency voltages VHF, the measure of the zero sequence component VSM from the stator voltages V31, V32, V33, the filtering operation of the high frequency harmonics, the measure of the maximum, minimum and zero points, using the computing device C, can be carried out by using low cost analogue circuits and there are various schemes which can be realised, as the one of FIG. 2, which represents a non limiting example of embodiment of the system according to the invention. Note that in such a scheme also the blocks B1, B2 are shown, which perform the field oriented control of the motor in a predetermined reference system.

In particular, the zero sequence voltage VSM is obtained by measuring, through the transducer TV, the voltage VS1 between the star centre N of the stator windings ST1, ST2, ST3 and the central point O of the capacitors C1, C2 of the direct current bus BS of the inverter PWM.

The signal VSM obtained at the output of TV is then filtered and amplified in order to achieve a good signal/noise ratio, while the notch filter EB, connected to the block B1, which, in turn, receives as an input the position of the airgap flux TF and the stator current IA, is used to eliminate the high frequency components in the current feedback loop.

On the other hand, such a feedback loop includes a current control device CC, connected in series to the block B2, which receives as an input the current signal I2 equal to the difference between the reference current I1 and the reaction current IR from the filter EB.

The current control device CC generates a reference signal of the voltage VQ with respect to the rotating reference system. The processing block B2 makes a transformation from the rotating reference system to a fixed axes system, in order to generate the stator reference voltage VR. This last voltage is then added to the high frequency component VHF and, finally, sent to the inverter PWM.

From the given description, the system characteristics and the method of control for an induction motor drive, which are the object of the present invention, are clearly defined, as well as the advantages.

Further, it is evident that several changes can be introduced to the control system according to the present invention, without changing the innovation principles of the invention, as well as it is clear that, in the practical implementation of the invention, the illustrated details can be made of any material, in any shape and of any dimension according to specific needs. Moreover the details themselves can be substituted by others technically equivalent.

What is claimed is:

1. A control method for electric drive means with induction motors, the method comprising:

using a high frequency rotating magnetic field to produce a change of the saturation level of the ferromagnetic core, as a function of the relative positions taken by said rotating magnetic field and by a main magnetic field, and wherein the method comprises at least one of the following phases, taken as single phases or in combination thereof:

superimposing a direct or inverse symmetrical set of high frequency voltages to a three-phase stator voltage of an electric machine, so that a zero sequence component of an airgap flux, and consequently a zero sequence stator voltage component and a zero sequence component of the stator current, comprise, besides a third harmonic component, a harmonic with a frequency proportional to the difference between the frequency of a set of three-phase voltages and the frequency of said three-phase stator voltage, or injection of a direct or inverse symmetrical set of high frequency currents or of just one high frequency current along the direction of said airgap flux, these currents are added to the stator current of said electric machine, so that said zero sequence components of the airgap flux, and consequently a zero sequence voltage component and the zero sequence component of the stator current, comprise, besides a third harmonic component, a harmonic with a frequency proportional to the difference between the frequency of said high frequency current and the frequency of said stator current.

2. A control method as claimed in claim 1, wherein a total zero sequence voltage, including a third harmonic voltage component and high frequency harmonic components, is obtained as an arithmetical mean of grounded phase voltages.

3. A control method as claimed in claim 3, wherein said total zero sequence voltage is obtained by measuring a voltage between a star centre of stator windings and a central point positioned between two capacitors connected along a direct current electric line, which feeds an electronic device of the inverter type.

4. A control method as claimed in claim 1, wherein a total zero sequence current is directly determined, through suitable sensors, or indirectly determined through the measure of the zero sequence voltage drop in any of the points of the connection line between the inverter and the electric motor; the voltage drop is measured by determining the voltage taken between a star centre, obtained by connecting a three impedance star through a shunt to the supply conductors of the motor, and a central point positioned between two capacitors connected along the direct current electric line, which feeds an electronic device of the inverter type.

5. A control method as claimed in claim 1, wherein said third harmonic component of said zero sequence voltage, or of said zero sequence current, is eliminated by a first signal filter, while further high frequency harmonics are eliminated by means of a second filter, so as to obtain a reference signal, which has a frequency value proportional to the difference between the frequency of said set of three-phase voltages and the frequency of said three-phase stator voltage; said reference signal allows to determine, by using a computing device C, a reference position of said airgap flux.

6. A control method as claimed in claim 1 wherein said zero sequence stator voltage component is filtered and amplified, so as to obtain a good ratio between signal/noise, while a notch filter, connected to a first signal processing and control block, is used to eliminate undesirable high frequency components from a feedback loop of current signals.

7. A control method as claimed in claim 6, wherein said feedback loop comprises at least one control device of said current signals, and said device sends a reference signal, with respect to the rotating axes, to a second processing and control block, so as to generate a reference voltage value, with respect to a fixed axis system; said reference voltage is then added to a high frequency component and it is then sent to an electronic device of the inverter type.

8. A control method as claimed in claim 7, wherein a high frequency voltage component is added to said voltage reference signal or to the output of said at least one current control device.

9. A control system for electric drive means with induction motors, the system comprising:
a high frequency rotating magnetic field to produce a change of a saturation level of a ferromagnetic core as a function of a relative positions taken by said rotating magnetic field and by a main magnetic field, wherein the system includes
measuring means to measure zero sequence voltage signals or zero sequence current signals,
filtering and amplifying means to filter and amplify zero sequence voltage signals or zero sequence current signals so as to obtain a ratio between signal/noise, and
a notch filter, which is connected to a first signal processing and control block, and is used to eliminate undesirable high frequency components from a feedback loop of current signals.

10. A control system as claimed in claim 9, comprising at least one current control device, so as to generate a reference voltage value, with respect to a rotating or fixed axis system.

11. A control system as claimed in claim 9, wherein a zero sequence voltage, or a zero sequence current is generated by adding a high frequency voltage component to a voltage reference signal or to an output of a current control device and comprising an electronic inverter device which receives said high frequency voltage together with said voltage reference signal.

* * * * *